United States Patent [19]

Todt et al.

[11] 4,140,911

[45] Feb. 20, 1979

[54] SELF-POWERED IN-CORE NEUTRON DETECTOR ASSEMBLY WITH UNIFORM PERTURBATION CHARACTERISTICS

[75] Inventors: William H. Todt, Elmira Heights; Kerwin C. Playfoot, Horseheads, both of N.Y.

[73] Assignee: Westinghouse Electric Corp., Pittsburgh, Pa.

[21] Appl. No.: 813,562

[22] Filed: Jul. 7, 1977

[51] Int. Cl.² .............................................. G01T 3/00
[52] U.S. Cl. ................................. 250/390; 176/19 R
[58] Field of Search ............... 250/390, 391, 392, 370, 250/371; 176/19 R

[56] References Cited

U.S. PATENT DOCUMENTS

| 3,751,333 | 8/1973 | Drummond et al. | 176/19 R |
| 3,940,627 | 2/1976 | Klar | 250/390 |

*Primary Examiner*—Davis L. Willis
*Attorney, Agent, or Firm*—W. G. Sutcliff

[57] ABSTRACT

A self-powered in-core neutron detector assembly in which a plurality of longitudinally extending self-powered detectors have neutron responsive active portions spaced along a longitudinal path. A low neutron absorptive extension extends from the active portions of the spaced active portions of the detectors in symmetrical longitudinal relationship with the spaced active detector portions of each succeeding detector. The detector extension terminates with the detector assembly to provide a uniform perturbation characteristic over the entire assembly length.

9 Claims, 7 Drawing Figures

SELF-POWERED IN-CORE NEUTRON DETECTOR ASSEMBLY WITH UNIFORM PERTURBATION CHARACTERISTICS

BACKGROUND OF THE INVENTION

The present invention relates to self-powered neutron detectors and to detector assemblies incorporating a plurality of detectors for in-core nuclear reactor radiation monitoring. A self-powered detector is a device which does not require a voltage potential, but generates a signal between a central conductive emitter and a spaced coaxial sheath collector, with insulation means provided therebetween. A large number of such detectors as required to adequately monitor the radiation levels throughout the reactor core to provide sufficient data to characterize the core fuel performance and to provide safety monitoring data. The detectors are typically spaced along the length of the core to provide neutron flux measurements along the core length.

In the presently used multi-detector assemblies, the active detector portions of the individual detectors are spaced along a longtudinal path of the bundled assembly so that the cable leads for the respective spaced detectors only extend as far as the respective detector active portion. This means that several cables are closely spaced from the first detector while none are present at the furthest extending terminal detector of the assembly. This difference in mechanical structure and materials present in the immediate area of each detector active portion results in variations in detector sensitivity due to the individual local perturbation factors, and complicates analysis of the signal outputs from the various detectors.

A neutron detector assembly is described in U.S. Pat. No. 3,751,333, in which the detectors and their lead cables are disposed between a hollow center calibration tube, and a laterally flexible outer sheath, with mechanical spacers running between the spaced detectors and cables along the entire length of the assembly. The spacers keep the detectors properly spaced. In the commerical design of the above-described patent, the spacers are neutron absorptive solid wire members which depress the neutron level at the active detector. This is particularly the case at the terminal end of the assembly where a plurality of such wire spacers is in close proximity to the furthest extending active detector. This terminal active detector sees a lower neutron flux for a given incident flux level than the other spaced detectors where there are less solid wire spacers.

SUMMARY OF THE INVENTION

A self-powered neutron detector assembly includes a plurality of longitudinally extending self-powered detectors which have neutron responsive active portions spaced along a longitudinal path. Low neutron absorptive extensions extend from the active portions of the spaced detectors in symmetrical longitudinal relationship with the spaced active detector portions of each succeeding detector and terminate with the extending end of the assembly.

The low neutron absorptive extension comprises an extension of the conductive sheath of the detector with insulating means filling the volume defined by the sheath which is sealed at its terminal end. These low neutron absorptive extensions thus run side-by-side with the cable leads and the spaced active detector portion, so that at each active detector portion the local perturbation factors are uniform because of the uniform mechanical structures and materials symmetrically present at each active detector portion.

DESCRIPTION OF THE PREFERRED EMBODIMENTS

Figure 1:
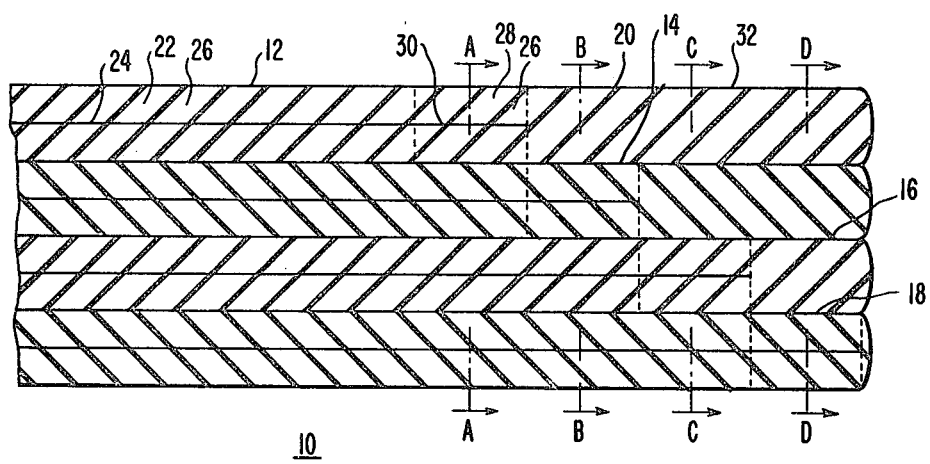
FIG. 1 is a schematic representation of an embodiment of the present invention.

The invention can be best understood by reference to the simplified representations of FIGS. 1 and 2 in which four detectors in side-by-side relation make up the detector assembly 10. The neutron detector assembly 10 is an elongated assembly with a plurality of longitudinally extending self-powered detector 12, 14, 16, and 18. The detector 12 comprises an elongated conductive sheath 20, and has three interior portions. A lead cable portion 22 extends from one end of the assembly, and a conductive center wire 24 is centrally disposed within the sheath 20, with insulating means 26 disposed between the wire 24 and the sheath. An active self-powered detector portion 28 is intermediate to the assembly ends and comprises a neutron absorptive central conductive emitter 30 which is electrically connected at one end to the lead cable center wire 24. Insulating means 26 is likewise disposed between the central conductive emitter 30 and the sheath 20. A low neutron absorptive extension portion 32 extends from the other end of the central conductive emitter, and comprises insulating means 26 typically alumina filling the volume defined by the sheath 20 which is sealed at its terminal end 34. The active detector portion 28 of each detector is represented by the dotted lines in FIG. 1.

Figure 2A:
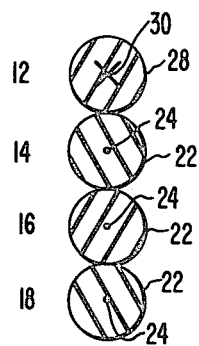
FIGS. 2A–2D are cross-sectional representations taken along the lines A—A, B—B, C—C, D—D of FIG. 1.
Figure 2B:
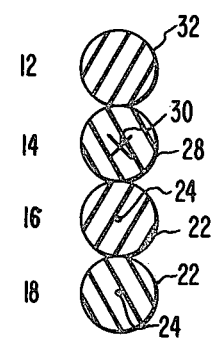
Figure 2C:
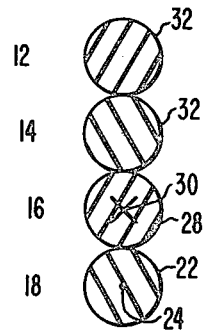
Figure 2D:
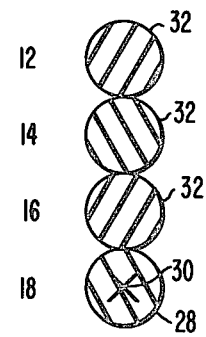

The detectors 14 and 16 have the same three portions, a cable portion 22, an active detector portion 28, and the extension portion 32 as detector 12, but with the active self-powered detector portion 28 being spaced along the longitudinal path of the assembly 10. In FIG. 2A in a sectional representation taken through the assembly 10 along line A—A of FIG. 1 at the active emitter 28 portion of detector 12, the portions of detectors 14, 16 and 18 are the cable lead portions 22. The active detector portion neutron responsive central conductive emitter 30 is represented as an x in FIGS. 2A–2D to differentiate from the cable center wire 24. In FIG. 2B, taken through assembly 10 along line B—B of FIG. 1 at the active emitter portion of detector 14, the cable lead portions 22 of detectors 16 and 18 are seen, but the low neutron absorptive extension portion 32 of detector 12 is adjacent the active portion of detector 14. In FIG. 2C, taken through the assembly 10 along line C—C of FIG. 1 at the active emitter portion of detector 16, the low neutron absorptive extension portions 32 from detectors 12 and 14 extend therealong and the cable lead portions 22 of detector 18. Detector 18 only has a cable lead portion and an active self-powered emitter portion since it is the furthest extending detector at the terminal end of assembly 10. Thus, in FIG. 2D taken through assembly 10 along line D—D of FIG. 1 at the active emitter portion of detector 18, the low neutron absorptive extension portions 32 of detectors 12, 14 and 16 are adjacent the active portion of detector 18. The conductive sheath of detector 18 is sealed at its terminal end which is the terminal end of the assembly 10.

The low neutron absorptive extension typically comprises a temperature and radiation stable insulator such as alumina or magnesia within the conductive sheath. A variety of insulators can be used which have a low neutron absorptive characteristic.

It may be desirable for some applications to provide a low neutron absorptive extension 32 for the furthest extending detector 18, with the extension 32 for detector 18 as well as the extensions for detectors 12, 14 and 16 all extending to a common assembly terminal end which is some distance beyond the end of the active detector portion 30 of the detector 18.

Figure 3:
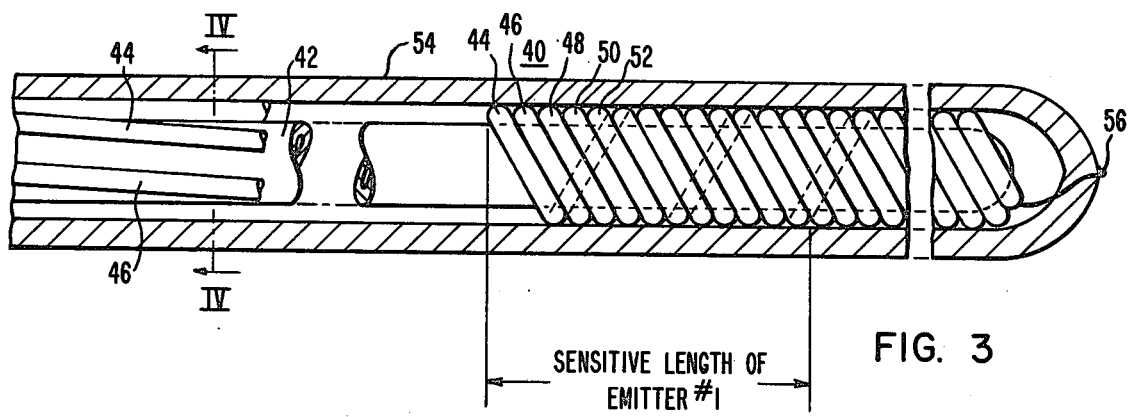
FIG. 3 is a side elevation view of a portion of another embodiment of the present invention.
Figure 4:
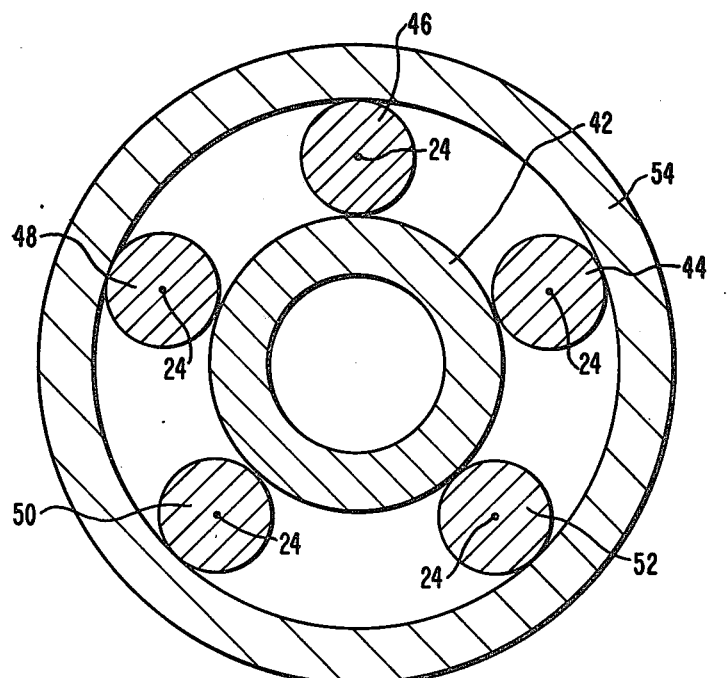
FIG. 4 is a cross-section view taken along line IV—IV of FIG. 3.

In another embodiment of the present invention illustrated in FIGS. 3 and 4, the detector assembly 40 comprises an elongated hollow calibration tube 42, with four detectors 44, 46, 48, 50 and a thermocouple lead cable 52 helically wrapped about calibration tube 42 in a pentafilar manner. The detectors 44, 46, 48 and 50 are three-part assemblies much as the embodiment represented in FIGS. 1 and 2, which are then helically wrapped about the calibration tube. The detectors 44, 46, 48 and 50 each comprise a cable lead portion, an active detector portion, and an extension portion as explained above for the detectors of FIGS. 1 and 2.

In the assembly of FIGS. 3 and 4, the elongated hollow calibration tube 42 extends proximate to the sealed terminal end of the sheath 54 with the low neutron absorptive detector extension portions from detectors 44, 46, 48 and 50 being helically wrapped to the end of the calibration tube 42.

The helical wrap of the detector assemblies and the thermocouple cable is a loose wrap of about one revolution per foot for the out-of-core portions of the calibration tube. For the in-core portion, the detectors and the thermocouple cable are tightly wrapped in abutting side-by-side relationship. The active detector portions of the respective detectors are again spaced along the length of the assembly, with just the sensitive active detector portion of one detector 46 shown for its full helical active length in FIG. 3. The helical wrap of the detectors provides a longer active emitter portion for a given length of the core and permits greater detector sensitivity. The provision of the helically wrapped low neutron absorptive extension portions extending from the ends of the active emitter portions of the detectors maintains a uniform perturbation characteristic along the entire assembly 40.

The calibration tube 42 permits insertion of a movable calibration detector within the tube along the entire core length.

As seen in FIG. 3, the entire detector assembly 40 is disposed within a laterally flexible outer sheath 54, which facilitates insertion of the entire assembly from outside of the reactor vessel. A thermocouple 56 is provided at the terminal end of outer sheath 54, and the thermocouple cable 52 wrapped about the calibration tube is electrically connected to a thermocouple which can be mounted on the interior or exterior of the sheath 54.

The invention has been described by reference to embodiments in which four detectors were used in the assembly by way of example. The number of detectors used is a matter of choice, but is generally limited by the diameter of the core thimble into which the assembly can be fitted.

We claim:

1. A self-powered neutron detector comprising, an elongated tubular conductive sheath, which detector has three interior portions extending within the tubular conductive sheath, including a lead cable portion extending from one end with a conductive center wire and insulating means disposed between the center wire and the sheath, an active detector portion intermediate between the detector ends, which active detector portion comprises a neutron absorptive central conductive emitter which is electrically connected at one end to the lead cable center wire, with insulating means disposed between the central conductive emitter and the sheath, and a low neutron absorptive extension portion which extends from the other end of the central conductive emitter to a sealed sheath end with insulating means filling the volume defined by the sheath.

2. The detector assembly set forth in claim 1, wherein a plurality of such detectors form a detector assembly and the active detector portions of the respective detectors are spaced along the length of the assembly, and wherein the detector extension portions extend at least to the terminal end of the furthest longitudinally extending detector.

3. The detector assembly set forth in claim 2, wherein a plurality of such detectors are helically wrapped about a hollow calibration tube and are disposed within a flexible outer sheath.

4. The detector assembly set forth in claim 3, wherein for the in-core portions of the assembly the helical wrap of the detectors is a side-by-side tight wrap.

5. An in-core neutron detector assembly comprising a plurality of longitudinally extending self-powered detectors each of which comprise an elongated tubular conductive sheath, with at least one of the detectors having three interior portions extending within the tubular conductive sheath including a lead cable portion extending from one end of the sheath with a conductive center wire and insulating means disposed between the center wire and the sheath, an active detector portion intermediate the sheath ends, which active detector portion comprises a neutron absorptive central conductive emitter which is electrically connected at one end to the lead cable center wire, with insulating means disposed between the central conductive emitter and the sheath, and a low neutron absorptive extension portion comprising a sheath extension which extends from the other end of the central conductive emitter to a sealed sheath end, with insulating means filling the volume defined by the sheath, which extension portions extend at least to the terminal end of the furthest extending detector in a symmetrical relationship to provide the assembly with a uniform perturbation characteristic along the active portions of the detectors of the assembly.

6. The detector assembly set forth in claim 5, wherein a laterally flexible protective outer sheath is provided about the assembly.

7. The detector assembly set forth in claim 5, wherein a thermocouple lead cable is included within the assembly extending beyond the terminal end of the furthest longitudinally extending detector.

8. The detector assembly set forth in claim 5, wherein the plurality of detectors are helically wrapped about a hollow calibration tube.

9. The detector assembly set forth in claim 8, wherein the helical wrap about the calibration tube over the active detector length is a tight wrap with the cables abutting.

* * * * *